US008806661B2

(12) United States Patent
Wang et al.

(10) Patent No.: US 8,806,661 B2
(45) Date of Patent: Aug. 12, 2014

(54) METHOD AND DEVICE FOR DISTRIBUTING ELECTRONIC DOCUMENTS

(75) Inventors: Donglin Wang, Beijing (CN); Kaihong Zou, Beijing (CN)

(73) Assignee: Sursen Corp., Beijing (CN)

( * ) Notice: Subject to any disclaimer, the term of this patent is extended or adjusted under 35 U.S.C. 154(b) by 671 days.

(21) Appl. No.: 12/706,785

(22) Filed: Feb. 17, 2010

(65) Prior Publication Data

US 2010/0146640 A1    Jun. 10, 2010

Related U.S. Application Data

(63) Continuation of application No. PCT/CN2008/072045, filed on Aug. 19, 2008.

(30) Foreign Application Priority Data

Aug. 22, 2007    (CN) .......................... 2007 1 0120632

(51) Int. Cl.
*G06F 7/04*        (2006.01)
*H04L 29/06*       (2006.01)
*H04L 9/32*        (2006.01)
*G06F 12/14*       (2006.01)
*G06F 21/00*       (2013.01)
*G06F 21/10*       (2013.01)
*G11B 20/00*       (2006.01)

(52) U.S. Cl.
CPC .......... *G06F 21/10* (2013.01); *G11B 20/00137* (2013.01); *G11B 20/00746* (2013.01); *G11B 20/00753* (2013.01); *G11B 20/00811* (2013.01)
USPC ............. 726/31; 713/156; 713/165; 713/168; 713/187; 705/51; 705/57

(58) Field of Classification Search
CPC .............. G06F 21/10; G11B 20/00137; G11B 20/00746; G11B 20/00753; G11B 20/00811
USPC .................... 726/31; 713/156, 165, 168, 187; 705/51, 57
See application file for complete search history.

(56) References Cited

U.S. PATENT DOCUMENTS

2005/0089190 A1 *   4/2005   Shavit ........................... 382/100
2007/0016783 A1 *   1/2007   Saito et al. ..................... 713/175

FOREIGN PATENT DOCUMENTS

| CN | 1480879 A | 3/2004 | .............. G06F 17/60 |
| CN | 1726448 A | 1/2006 | ................ G06F 1/00 |

(Continued)

OTHER PUBLICATIONS

First Office Action issued for Chinese Application No. 2007101206321.

(Continued)

*Primary Examiner* — Aravind Moorthy
(74) *Attorney, Agent, or Firm* — Duane Morris LLP

(57) ABSTRACT

Embodiments provide a method and device for distributing an electronic document. The electronic document possesses first authorized copies information used to record a first number of authorized copies for the electronic document a local user may distribute. Every time the electronic document is distributed to a user, second authorized copies information is sent to the user, which second authorized copies information is used to record a second number of authorized copies for the electronic document the user may distribute, and the second number of authorized copies is less than or equal to the first number of authorized copies currently recorded in the first authorized copies information.

16 Claims, 8 Drawing Sheets

(56) References Cited

FOREIGN PATENT DOCUMENTS

| CN | 1920773 A | 2/2007 | ............. G06F 9/445 |
| CN | 1928867 A | 3/2007 | ............. G06F 17/30 |
| JP | 2004289471 A | 10/2004 | ................ H04L 9/32 |

OTHER PUBLICATIONS

Second Office Action issued for Chinese Application No. 2007101206321.
International Search Report issued for PCT/CN2008/072045.

* cited by examiner

METHOD AND DEVICE FOR DISTRIBUTING ELECTRONIC DOCUMENTS

CROSS-REFERENCE TO RELATED APPLICATIONS

This application is a continuation of PCT/CN2008/072045 filed Aug. 19, 2008 which claims the benefit of CN 200710120632.1 filed Aug. 22, 2007, both of which applications are fully incorporated herein by reference.

FIELD OF THE TECHNOLOGY

The present invention relates to Digital Rights Management (DRM) technologies, and more particularly, to a method and device for distributing electronic documents.

BACKGROUND OF THE INVENTION

To protect copyright of electronic documents including electronic books, multimedia etc. so as to protect bookman's rights and interests, the DRM technologies are adopted at present to protect electronic documents, such as electronic books and multimedia, from unauthorized play or unauthorized copy. The DRM technologies protect digital contents by encrypting electronic documents and appending application rules. And, the application rules may be adopted to determine whether a user meets requirements for applying the electronic documents.

In the prior DRM technologies, a problem of whether copies for electronic documents may be distributed is generally not taken into consideration so as to protect electronic documents from being copied or applied illegally. That is, after an electronic document is possessed, the electronic document may be merely opened in a limitative device, meanwhile distributing copies for the electronic document to others may be forbidden. Alternatively, the electronic document may be freely copied without any limitation. Neither of the two modes above may perform reasonable protection on documents.

It can be seen that, the prior DRM technologies cannot freely implement a distribution for copies for electronic documents on a certificate of protecting digital rights.

SUMMARY OF THE INVENTION

Embodiments of the present invention provide a method and a device for distributing electronic documents, so as to freely implement a distribution for copies for electronic documents.

Embodiments of the present invention provide a method for distributing an electronic document, in which the electronic document includes first authorized copies information which records a first number of authorized copies for the electronic document a local user may distribute, every time distributing the electronic document to a user the method includes:

sending second authorized copies information to the user, wherein the second authorized copies information records a second number of authorized copies for the electronic document the user may distribute, and the second number of authorized copies recorded in the second authorized copies information is less than or equal to the first number of authorized copies currently recorded in the first authorized copies information;

updating the first authorized copies information, updated first number of authorized copies recorded in the updated first authorized copies information is equal to a value obtained by subtracting the second number of authorized copies recorded in the second authorized copies information from the first number of authorized copies recorded in the first authorized copies information last time.

Embodiments of the present invention provide a device for distributing an electronic document, including:

a first unit, adapted to register first authorized copies information of an electronic document in or out the electronic document;

a second unit, adapted to send the electronic document and second authorized copies information to a user, wherein the second authorized copies information is used to record a second number of authorized copies for the electronic document which the user may distribute, and the second number of authorized copies recorded in the second authorized copies information is less than or equal to a first number of authorized copies currently recorded in the first authorized copies information;

a third unit, adapted to update the first authorized copies information recorded in the first unit using the second authorized copies information sent by the second unit, in which updated first number of authorized copies recorded in the updated first authorized copies information is equal to a value obtained by subtracting the second number of authorized copies recorded in the second authorized copies information from the first number of authorized copies recorded in the first authorized copies information last time.

Compared with the prior art, in accordance with the method and device for distributing electronic documents provided by embodiments of the present invention, a limitation may be set for number of authorized copies for electronic documents used by a user, and the user may distribute the whole or partial of copies for his possessed electronic document to other authorized users within the limitation for the number of authorized copies, meanwhile the number of authorized copies possessed by the user is correspondingly reduced. And subsequently, the authorized user who has received the electronic document may be assigned with a right for distributing a certain number of authorized copies for the electronic document, and then the authorized user may use the received electronic document within the limitation of the certain number of authorized copies, and thus the distribution of the electronic document is implemented.

EMBODIMENTS OF THE INVENTION

To make objectives, technical solutions and advantages of embodiments of the present invention clearer, a detailed description of the present invention is hereinafter given with reference to specific embodiments and the accompanying drawings.

In the embodiments of the present invention, authorized copies information is set for each electronic document so as to register number of authorized copies for an electronic document. According to the number of authorized copies recorded in the authorized copies information of an owned electronic document, a first user may distribute a certain number of authorized copies for the electronic document to a second user, in which the certain number of authorized copies is less than or equal to the registered number of authorized copies. And subsequently, the registered number of authorized copies may be reduced correspondingly. The second user obtains the certain number of authorized copies for the electronic document distributed to him, and may use the received electronic document within the limitation of the certain number of authorized copies.

In the above distribution process, the first user may be called as owner of the electronic document, and the second user may be called as the receiver of the electronic document. After receiving a copy of the electronic document, the receiver may become the owner. The first and second users are both users of the electronic document. Operations for using the electronic document by users may include browsing electronic document, and/or distributing copy of the electronic document to another user.

Figure 1:
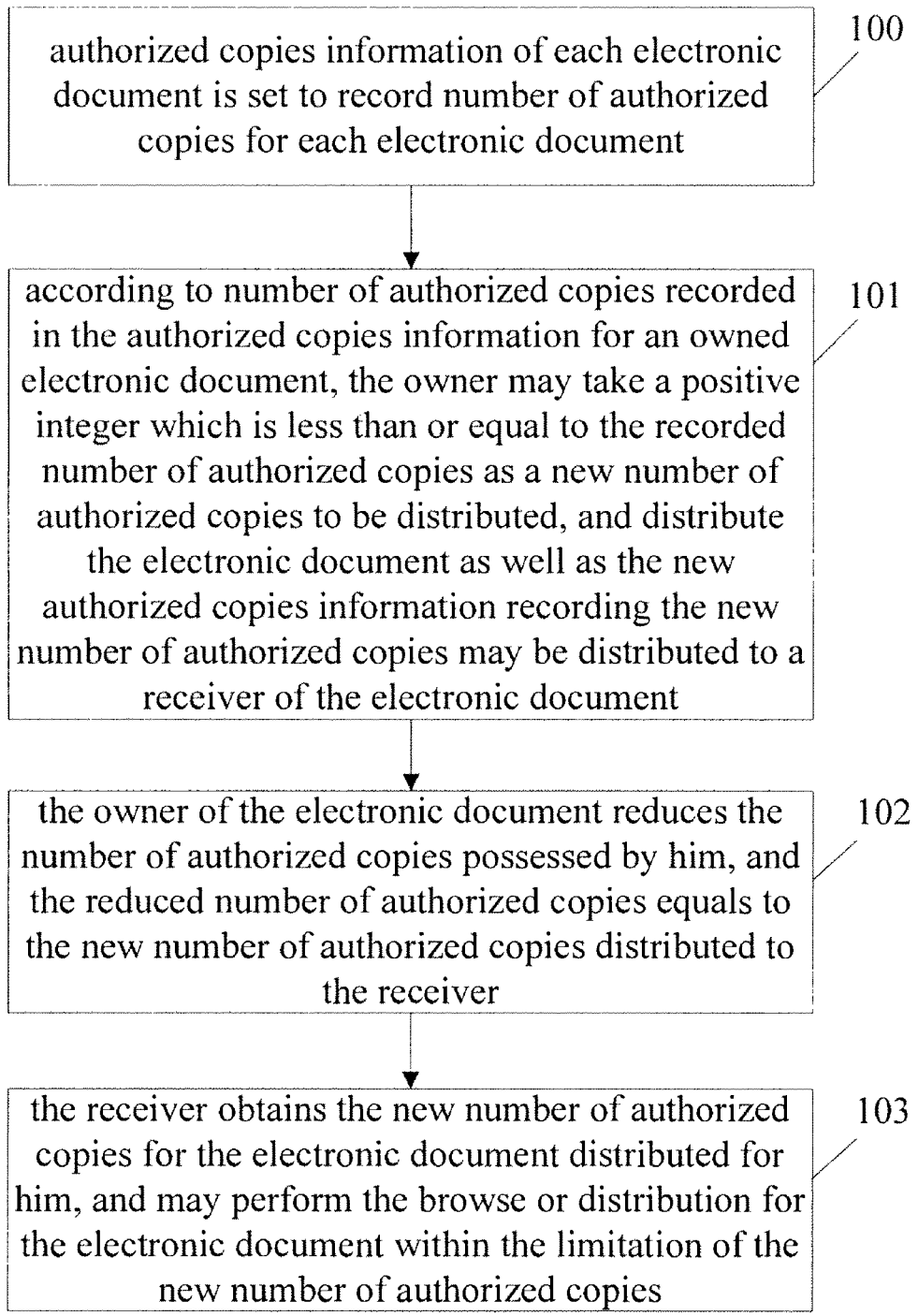
FIG. 1 is a flow chart illustrating a management method for implementing usage rights of an electronic document in accordance with an embodiment of the present invention.

FIG. 1 is a flow chart illustrating a management method for implementing usage rights of an electronic document in accordance with an embodiment of the present invention. As shown in FIG. 1, the management method includes the following blocks.

Block 100: authorized copies information of each electronic document is set to record number of authorized copies for each electronic document.

Here, the authorized copies information of each electronic document may be set separately outside each electronic document, or alternatively may be set in the electronic document.

Block 101: according to number of authorized copies recorded in the authorized copies information of an owned electronic document, a positive integer which is less than or equal to the recorded number of authorized copies may be taken as a new number of authorized copies to be distributed by the owner, and the electronic document as well as the new authorized copies information recording the new number of authorized copies may be distributed to a receiver of the electronic document.

And the electronic document may be text document information, and/or audio information, and/or video information.

There is a limitation for number of authorized copies to be used by an owner of an electronic document. Only if the number of authorized copies is larger than zero, the owner of the electronic document may be able to browse or distribute the electronic document. When the owner of the electronic document is distributing the electronic document to a receiver, the number of authorized copies being distributed cannot exceed that possessed by the owner.

When the owner of an electronic document is distributing the electronic document, the electronic document is encrypted with encryption logic so as to guarantee the security of the electronic document, and to implement copyright protection of the electronic document. The encryption logic may be various. The symmetrical or dissymmetrical key may be adopted to perform the encrypting. The single layer or multi-layer encrypting may also be adopted. To guarantee that illegal receivers cannot use electronic documents obtained illegally. Embodiments of the present invention adopt a character of an authorized receiver to encrypt the electronic documents. Only the authorized receiver may decrypt the electronic document by adopting the character of itself, and then obtain the digital contents of the electronic document. Generally speaking, the electronic document is stored with encryption, and the decryption key is stored correspondingly with the electronic document. Therefore, when the owner of the electronic document is sending the electronic document, it is unnecessary to decrypt the electronic document and then encrypt the electronic document with the character of the authorized receiver, what is need to do is to encrypt the original decryption key with the character of the authorized receiver and send the electronic document and the decryption key which has already been encrypted to the receiver, which may also guarantee that only an authorized receiver can adopt character of itself to decrypt the electronic document.

The character of the document receiver may be a key of Public Key Infrastructure (PKI), and then the owner of the electronic document may adopt the public key of the PKI to perform the encryption. Under this circumstance, the document receiver may obtain the original document by adopting a private key of the PKI to perform the decryption. The character of the document receiver may also be a sequence number of a hard disk, or a Media Access Control (MAC) address of a network card, or an Internet Protocol (IP) address, or a sequence number of a Central Processing Unit (CPU), in a device where the document receiver located. If the device where the document receiver located is a mobile telephone, the character of the document receiver may also be a sequence number of a Subscriber Identity Module (SIM), or alternatively is a combination of the above features.

Block 102: the owner of the electronic document reduces the number of authorized copies possessed by him, and the reduced number of authorized copies equals to the new number of authorized copies distributed to the receiver.

Block 103: the receiver obtains the new number of authorized copies for the electronic document distributed for him, and may perform the browse or distribution for the electronic document within the limitation of the new number of authorized copies.

In addition to the limitation of the number of authorized copies, in practice, it is necessary to set usage rules for electronic documents, so as to limit the usage rights of users and receivers of the electronic document. For example, an expiring date may be set for an electronic document. When using an electronic document, it is necessary to check whether the available number of authorized copies is not equal to zero and whether the electronic document is not overdue, the electronic document is forbidden to be used if any check does not meet the requirements.

In accordance with the embodiment of the present invention, authorization certificate is formed according to number of authorized copies for an electronic document as well as the usage rules of the electronic document. The electronic document may be used by a user based on the authorization certificate of the electronic document. One electronic document may correspond to at least one authorization certificate. Generally, one electronic document corresponds to one authorization certificate.

Based on the above technical solution, a detailed description about the management method for implementing usage rights of electronic document are given with reference to the following embodiments.

In a first embodiment of the present invention, Client A is the owner of an electronic document which possesses M copies for document S. Client B is the receiver of the electronic document. Client A prepares to distribute N copies for document S to Client B, in which N is less than or equal to M. The clients may be set in an electronic document reader or a multimedia player. And the document S stored by Client A is encrypted and corresponds to authorization certificate S0.

In the embodiment, the authorization certificate includes a decryption key which has been encrypted, authorized copies information of the electronic document, as well as a digital digest of the electronic document. Because the electronic document S is stored with encryption, the decryption key of the electronic document S is encrypted with character of Client A, which forms the decryption key which has been encrypted. Also, the decryption key which has been encrypted may be separated stored or may be put in the electronic document S.

The number of authorized copies for the electronic document refers to authorized copies information, that is, number of authorized copies for the electronic document S owned by Client A. The number of authorized copies for the electronic document S puts a limitation on that which may be used or distributed. Client A may only distribute all or partial of the number of authorized copies owned by itself to other users. That is to say, the number of authorized copies distributed by Client A to other users cannot exceed that owned by Client A. If the number of authorized copies for the electronic document S owned by Client A is zero, Client A will be forbidden to distribute the electronic document S.

The digital digest of an electronic document is a unique and fixed value generated by performing calculation on the electronic document. A digital digest is generally made for the binary data of an electronic document. Alternatively, a digital digest may also be made after performing regularization on contents of an electronic document. After an electronic document has been amended, the value of the digital digest of the electronic document will be changed as well. The digital digest needs to be re-calculated each time the electronic document is used, and then it is determined that whether the re-calculated digital digest is consistent with the digital digest in the authorization certificate. Therefore, the digital digest of an electronic document, which is taken as a certificate of determining whether the electronic document has been amended illegally, can guarantee security of the electronic document. And once an illegal user amends contents of the electronic document, it can be detected timely through the digital digest of the electronic document. Meanwhile, the digital digest of an electronic document may also be taken as an identifier of the electronic document. Based on digital digests, it may be determined that whether two electronic documents are the same. Hash algorithm may be adopted for calculating the digital digest.

Figure 2:
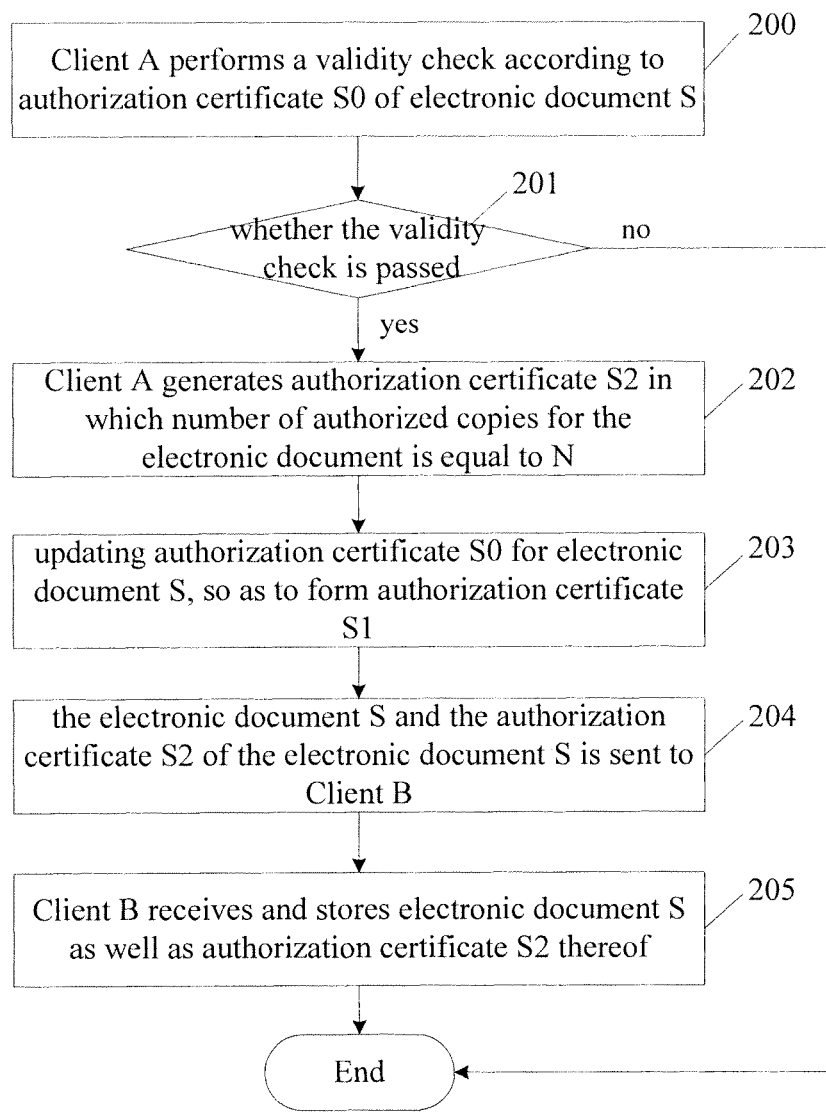
FIG. 2 is a flow chart illustrating a method for distributing usage rights of an electronic document in accordance with a first embodiment of the present invention.

FIG. 2 is a flow chart illustrating a method for distributing usage rights of an electronic document in accordance with the first embodiment of the present invention. As shown in FIG. 2, the method includes the following blocks.

Blocks 200, 201: a validity check is performed by Client A according to authorization certificate S0 of electronic document S. If the validity check is passed, block 202 is performed. Otherwise, the flow will be terminated.

In the block, the purpose for performing the validity check is to determine whether Client A has a right to distribute the electronic document S. The validity check performed in the embodiment according to the authorization certificate S0 includes: checking whether number of authorized copies for the electronic document S is not equal to zero according to the authorized copies information of the electronic document S, calculating a digital digest of the electronic document S, and then determining whether the calculated digital digest is consistent with that in the authorization certificate S0. If both check results are YES, it is determined that the validity check is passed, and distributing the electronic document S to Client B is allowed; Otherwise, the validity check is not passed, it is forbidden to distribute the electronic document, and the block is terminated. In practice, it will generally to determine at first whether Client A is an authorized user of the electronic document S during the validity check. Determination modes in the prior art, e.g, validating whether character of Client A is able to decrypt the encrypted decryption key in the authorization certificate, may be adopted to determine whether the current user is an authorized user, and no further descriptions will be given here.

In the embodiment, the electronic document S has a corresponding authorization certificate S0. If the electronic document S has not been encrypted and has not a corresponding authorization certificate S0, Client A generates randomly a key to encrypt the electronic document S. And then, an encrypted decryption key is generated by adopting character of Client A to encrypt the decryption key, and further number of authorized copies for the electronic document is specified and a digital digest of the electronic document is calculated, so as to generate an original authorization certificate S0.

Block 202: authorization certificate S2 in which number of authorized copies for the electronic document is equal to N is generated by Client A.

In this block, the authorization certificate S2 is corresponding to the electronic document S which will be distributed to Client B. In the authorization certificate S2, there are N copies for the electronic document S, and the digital digest of the electronic document S therein is the same as that in the authorization certificate S0. Client A re-generates the encrypted decryption key. And the way for re-generating the encrypted decryption key includes followings.

Mode a): a mode to re-encrypt original decryption key. In this mode, a public key of a digital certificate belonging to Client B is adopted to re-encrypt the decryption key of the electronic document S, and then the result which is taken as the encrypted decryption key is added to the authorization certificate S2.

The digital certificate of Client B, which is character of Client B, belongs to PKI key. Clients A and B adopt existed operations to obtain the digital certificate of Client B from a digital certificate authority server. Client A adopts a public key of obtained digital certificate belonging to Client B to encrypt the decryption key. Client B adopts a private key of obtained digital certificate belonging to itself to perform the decryption.

Mode b): a mode to encrypt a key randomly generated. In this mode, Client A generates a key randomly and re-encrypts electronic document S to be distributed with the key. And then Client A adopts a public key of the digital certificate belonging to Client B to encrypt the key randomly generated, so as to generate the encrypted decryption key to be added to the authorization certificate S2. Re-encrypting the electronic document S refers to that, decrypting the electronic document S using original decryption key, and then re-encrypting the decrypted electronic document S using the key randomly generated by Client A.

Mode c): a mode to encrypt authorization certificate where a randomly generated key located. In this mode, Client A generates a key randomly and re-encrypts the electronic document S to be distributed with the key. The key generated randomly is added to the authorization certificate S2. And then the authorization certificate S2 will be encrypted with a public key of the digital certificate belonging to Client B.

In modes b) and c), the electronic document S is re-encrypted using a randomly generated key, such that the key which is adopted by Client A to encrypt electronic document to be distributed is different from that which is adopted to encrypt locally existed electronic document. Hence, the following attack may be avoided, that is, obtaining a decryption key of the electronic document S from Client A, and decrypting the electronic document S in Client B using the obtain decryption key.

Block 203: authorization certificate S0 of the electronic document S is updated, so as to form authorization certificate S1.

In the block, the authorization certificate S1, that is, the updated authorization certificate S0, is authorization certificate of electronic document S existing in Client A. In the authorization certificate S1, number of authorized copies is (M-N), the digital digest of the electronic document S is the same as that in the authorization certificate S0. Moreover, the encrypted decryption key in the authorization certificate S1 is the same as that in the authorization certificate S0.

Block 204: the electronic document S and the authorization certificate S2 of the electronic document S is sent to Client B.

Here, the electronic document S is an encrypted electronic document. During the sending, the authorization certificate S2 may be added to the electronic document S to be sent. Alternatively, the authorization certificate S2 and the electronic document S may be sent separately.

Block 205: the electronic document S and the authorization certificate S2 of the electronic document S are received and stored by Client B.

Figure 3:
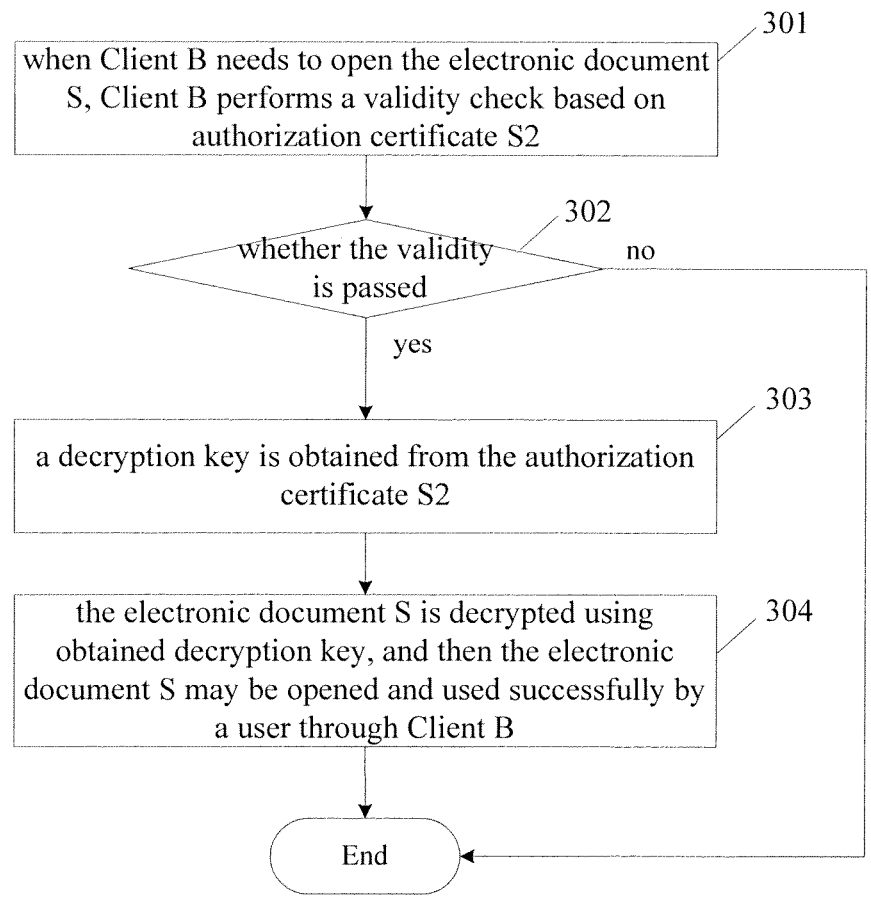
FIG. 3 is flow chart illustrating a method for adopting usage rights of electronic document in accordance with the first embodiment of the present invention.

FIG. 3 is a flow chart illustrating a method for adopting usage rights of an electronic document in accordance with the first embodiment of the present invention. As shown in FIG. 3, the method includes the following blocks.

Blocks 301, 302: when Client B needs to open the electronic document S, Client B performs a validity check based on the authorization certificate S2. If the check is passed, block 303 will be performed; otherwise, the flow will be terminated.

The validity check includes: checking whether number of authorized copies of an electronic document is not equal to zero; calculating a digital digest of the electronic document S, and checking whether the calculated digital digest is the same as that in the authorization certificate. If both checking results are YES, it is determined that the validity check is passed; otherwise, it is determined that the validity check is not passed.

Block 303: a decryption key is obtained from the authorization certificate S2.

In the block, if the authorization certificate S2 is generated by adopting mode a) or mode b) in block 202, a private key of the digital certificate belonging to Client B is adopted to decrypt the encrypted decryption key in the authorization certificate S2 to obtain the decryption key.

If the authorization certificate S2 is generated adopting mode c) in block 202, the private key of the digital certificate belonging to Client B is adopted to decrypt the authorization certificate S2. And the decryption key is obtained from the decrypted the authorization certificate S2.

Block 304: the electronic document S is decrypted using obtained decryption key, and then the electronic document S may be opened and used successfully by a user through Client B.

In accordance with another embodiment of the present invention, Client A distributes all M copies for the electronic document S to Client B. The electronic document S is stored by Client A with encryption. The electronic document S corresponds to the authorization certificate S0.

A USB electronic key (Ukey) supporting the PKI system may be taken as a character store device for Client B. Character of Client B stored in the device cannot be outputted. The character of Client B stored in the Ukey is the digital certificate of Client B. When Client B needs to perform the decryption with its digital certificate, Client B will obtain its digital certificate from the Ukey. The digital certificate stored in the Ukey may be obtained from an existed digital certificate authority server.

There is a database in Client B. Each record in the database corresponds to information about each electronic document. In the embodiment, authorization certificate of an electronic document is registered in the database. It should be explained that, although a database is taken as a recording carrier for the authorization certificate in the embodiment, it is not limited to adopting a database to perform the record in practical applications. For example, a file with a dedicated format may be adopted or other modes may be adopted to perform the record.

Figure 4:
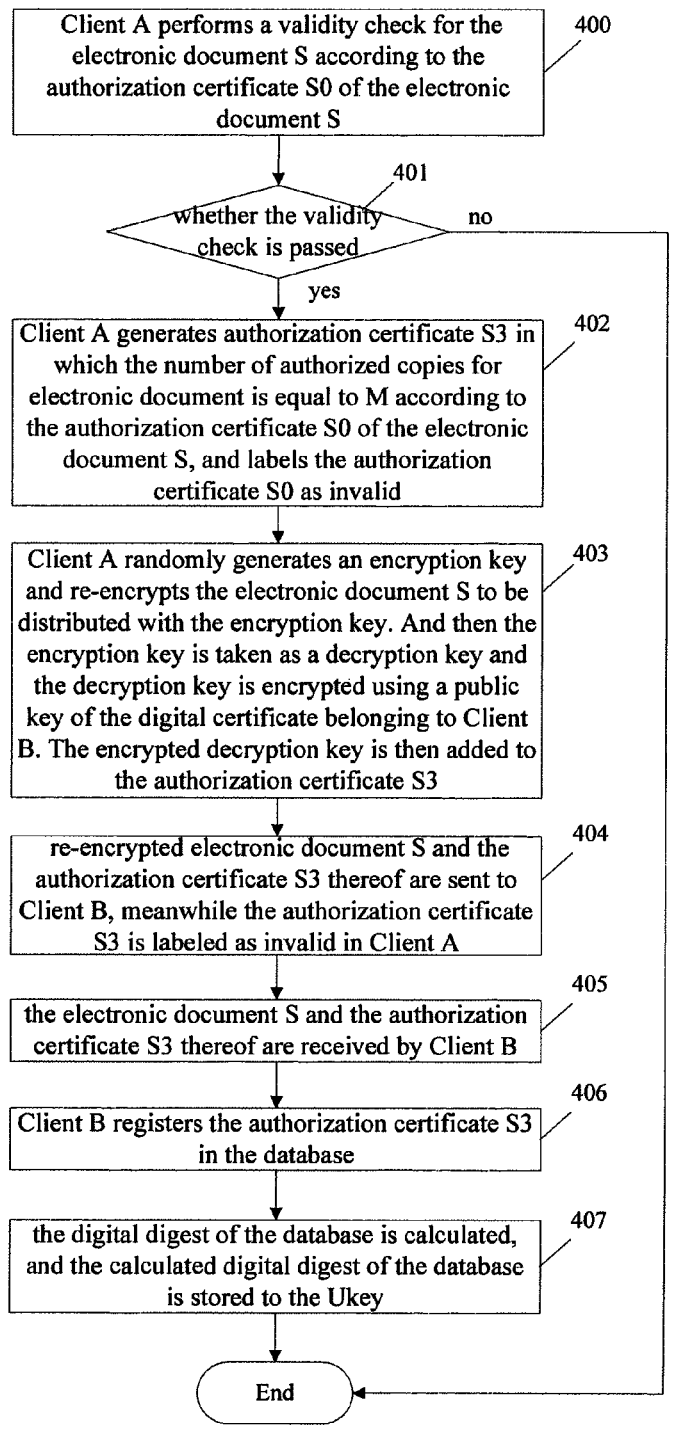
FIG. 4 is a flow chart illustrating a method for distributing usage rights of electronic document in accordance with a second embodiment of the present invention.

FIG. 4 is a flow chart illustrating a method for distributing usage rights of an electronic document in accordance with a second embodiment of the present invention. As shown in FIG. 4, the method includes the following blocks.

Blocks 400, 401: Client A performs a validity check for the electronic document S according to the authorization certificate S0 of the electronic document S. If the check is passed, block 402 will be performed. Otherwise, the flow will be terminated.

In the embodiment, the authorization certificate includes an encrypted decryption key, number of authorized copies for an electronic document, a digital digest of an electronic document as well as a timestamp. The timestamp is time information coming from a time server. The time information is used to record the time when an authorization certificate of an electronic document is generated. Updating authorization certificate is also taken as generating authorization certificate. The reason for taking the timestamp as the time information is that the time server may provide a relative exact time for each client.

In the block, the validity check includes the following: calculating a digital digest of the electronic document S, checking whether the calculated digital digest is consistent with that in the authorization certificate; checking whether number of authorized copies for the electronic document S is not equal to zero according to authorized copies information. If both the checking results are YES, the validity check is passed. Otherwise, the validity check is not passed.

Block 402: Client A generates authorization certificate S3 in which the number of authorized copies for electronic document is equal to M according to the authorization certificate S0 of the electronic document S, and labels the authorization certificate S0 as invalid.

The timestamp of the generated authorization certificate S3 is current time. The number of authorized copies for the electronic document and the digital digest of the electronic document are respectively the same as that in the authorization certificate S0. If the authorization certificate S0 is directly adopted as the authorization certificate of the electronic document to be distributed, update the timestamp for the authorization certificate S0. The encrypted decryption key in the authorization certificate S3 is still not determined after the block is executed.

Block 403: Client A randomly generates an encryption key and re-encrypts the electronic document S to be distributed with the encryption key. And then the encryption key is taken as a decryption key and the decryption key is encrypted using a public key of the digital certificate belonging to Client B. The encrypted decryption key is then added to the authorization certificate S3.

Block 404: re-encrypted electronic document S and the authorization certificate S3 thereof are sent to Client B, meanwhile the authorization certificate S3 is labeled as invalid in Client A.

Block 405: the electronic document S and the authorization certificate S3 thereof are received by Client B.

Block 406: the authorization certificate S3 is registered in the database by Client B, in one embodiment, that is to say, a record for received the authorization certificate S3 is added in the database of Client B.

What is recorded in the database is authorization certificate that has been registered. Authorization certificate that has not been registered cannot be used. The registered authorization certificate may be further divided into two categories: authorization certificate that has been labeled as invalid as well as authorization certificate that is still valid. During the process for distributing electronic documents, authorization certificate corresponding to electronic document which has been distributed out will be labeled as invalid in local. Although the invalid authorization certificate cannot be used, it is still recorded in the database as registered authorization certificate.

Repeated registration may be avoided by storing invalid authorization certificate. In the block, before registering the authorization certificate S3 in the database, Client B will determine firstly whether there is one registered authorization certificate in the database which is the same as the authorization certificate S3. If there is one registered authorization certificate stored in the database which is the same as the authorization certificate S3, Client B will not register the authorization certificate S3 in the database. Otherwise, Client B will add a record in the database, which records the encrypted decryption key, the digital digest of the electronic document, number of authorized copies for the electronic document and a timestamp in the authorization certificate S3.

In practical applications, a unique identifier may be set for each authorization certificate. And subsequently, when determining whether there is one registered authorization certificate in the database which is the same as authorization certificate S3, it is determined that whether there is registered authorization certificate in the database whose identifier is same with that of authorization certificate S3. Using the unique identifier makes the determining process easier. The registered authorization certificate include invalid and valid authorization certificate. The unique identifier may be a unique number or be a Hash value of the authorization certificate, that is, the digital digest of the authorization certificate, or be the combination of a unique number and the Hash value.

In practice, to guarantee validity of registered authorization certificate, when determining that there is no registered authorization certificate which is the same as the authorization certificate S3, Client B will not register the authorization certificate S3 until Client B determines that the authorization certificate S3 is valid, e.g., Client B determines that number of authorized copies in the authorization certificate S3 is larger than zero according to the authorized copies information in the authorization certificate S3.

Block 407: the digital digest of the database is calculated, and the calculated digital digest of the database is stored to the Ukey.

Here, the digital digest of the database is calculated according to all the data in the database, so as to further guarantee integrity and security of the database, and to avoid illegal users juggling contents in the database.

In this embodiment, receiving the authorization certificate and registering the authorization certificate are divided as two blocks, that is, blocks 405 and 406. In block 405, when Client B receives the electronic document and the authorization certificate thereof, the authorization certificate cannot be used because it hasn't been registered in the database. The registered authorization certificate can be used only after the authorization certificate in the database is registered in block 406.

In practice, the authorization certificate may further include a valid register term. The valid register term refers to the dead-time that the authorization certificate may be registered. A system will not allow registering the authorization certificate if the valid register term is overdue. And then in block 406, before registering the authorization certificate S3 in the database, it is necessary to further determine whether the valid register term of the authorization certificate to be registered is overdue. If the valid register term is overdue, the register is forbidden. If the valid register term is not overdue, the register is permitted, or to enter next determining process as mentioned above.

The valid register term may be a valid register time point, or may be a valid register time period. Specifically, if the valid register term is a valid register time point, e.g., the valid register time point is Dec. 30, 2006, and then a system will adopt a third party time obtained from a time server as the current time when processing the authorization certificate to be registered, and the system will determine whether the current time is later than Dec. 30, 2006. If the current time is later than Dec. 30, 2006, the system will not allow the register. If the valid register term is a valid register time period, e.g., the valid register time period is 100 days, and then the system will add the 100 days to the time information, such as a timestamp, recorded in the authorization certificate to be registered, and will take the adding result as the final valid register time. The system will obtain current time from the time server, and then determine whether the current time is later than the final valid register time. If the current time is later than the final valid register time, the register will be forbidden.

In addition, the system may periodically check the valid register term for the authorization certificate labeled as invalid. If the valid register term of the authorization certificate labeled as invalid is determined overdue, the authorization certificate labeled as invalid may be removed from the registered authorization certificate records. Alternatively, the authorization certificate labeled as invalid whose valid register term is overdue may still stored in the system, just failed to be involved in operations for avoiding repeated registration. The reason is as follows: though the authorization certificate labeled as invalid is existed for avoiding repeated registration, if the valid register term of the authorization certificate is overdue, the register will be forbidden, thus it is unnecessary to adopt the authorization certificate labeled as invalid to avoid repeated registration.

To reduce burden of the system, the system may periodically delete stored authorization certificate which is invalid and whose valid register term is overdue.

The valid register term may be designated by Client A, and is carried in the authorization certificate to be sent to Client B. Alternatively, the valid register term may be a default value. Operations for checking whether the valid register term of the authorization certificate labeled as invalid is overdue may be performed according to configurations, e.g., may be performed periodically, or may be performed when beginning to use clients.

Figure 5:
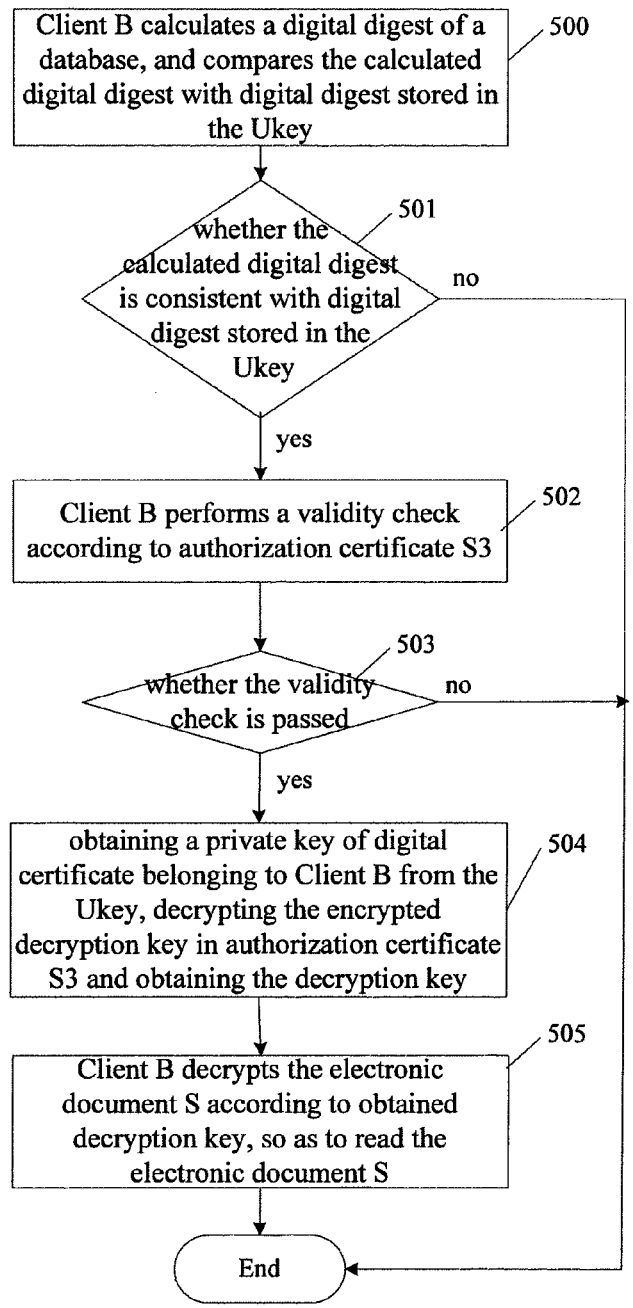
FIG. 5 is a flow chart illustrating a method for adopting usage rights of electronic document in accordance with the second embodiment of the present invention.

FIG. 5 is a flow chart illustrating a method for adopting usage rights of electronic document in accordance with the second embodiment of the present invention. As shown in FIG. 5, the method includes the following blocks.

Blocks 500, 501: when a user needs to use the electronic document S, Client B calculates a digital digest of a database, and compares the calculated digital digest with the digital digest stored in the Ukey to determine whether they are consistent with each other, so as to validate integrity of the database. If the calculated digital digest is consistent with the digital digest stored in the Ukey, block 502 will be performed. Otherwise, the flow will be terminated.

Blocks 502, 503: Client B performs a validity check according to the authorization certificate S3. If the validity check is passed, block 504 will be performed. Otherwise, the flow will be terminated.

Before performing the validity check, Client B will determine at first whether there is an authorization certificate corresponding to the electronic document S among registered and valid authorization certificates stored in the local database. Here, the authorization certificate corresponding to the electronic document S is the authorization certificate S3. If there is no the authorization certificate S3, validity check will not be performed and the flow will be terminated.

The validity check performed after obtaining the authorization certificate S3 includes: calculating a digital digest of the electronic document S; determining whether the calculated digital digest is consistent with the digital digest stored in the database; determining that number of authorized copies for the electronic document S is not equal to zero according to number-of-copies information in the authorization certificate S3. If all the items are passed, it is determined that the validity check is passed and Client B is entitled to perform block 504. Otherwise, it is determined that the validity check is not passed and terminate the flow.

Block 504: a private key of digital certificate belonging to Client B is obtained from the Ukey, and the private key is used to decrypt the encrypted decryption key in the authorization certificate S3, and then the decryption key is obtained.

Block 505: Client B decrypts the electronic document S according to obtained decryption key, so as to read the electronic document S.

After using or distributing an electronic document, it is necessary to update the database, including updating records of the database, as well as the digital digest of the database.

When returning the electronic document S to Client A, Client B obtains a timestamp from a time server, and generates authorization certificate S31 carrying a different timestamp with the authorization certificate S3, but having the same number of authorized copies and digital digest as that of the authorization certificate S3. The decryption key of the electronic document S is encrypted with character of Client A and the encrypted decryption key is added to the authorization certificate S31. then the authorization certificate S31 is sent to Client A. During the process of registering received the authorization certificate S31 in the database by Client A, because the timestamp of the authorization certificate S31 is different with that of the authorization certificate S3 labeled as invalid and stored locally, the authorization certificate S31 is allowed to be registered. And subsequently, number of authorized copies returned from Client B will be obtained. Thus, usage rights of electronic documents can be returned successfully.

It can be seen that the timestamp may be adopted to differentiate the authorization certificate S3 and the authorization certificate S31. Therefore, the timestamp may be takes as a differentiating identifier. Definitely, other differentiating identifiers may also be adopted. For example, when distributing electronic documents, identity identifiers of the distributor and/or receiver may be recorded in the authorization certificate. And then, the distributor and receiver of the authorization certificate S3 are respectively Clients A and B. The distributor and receiver of the authorization certificate S31 are respectively Clients B and A. Therefore, it can be seen that the authorization certificate S3 and the authorization certificate S31 may also be differentiated by identity identifiers of distributor and/or receiver thereof, so as to return the number of authorized copies of electronic document successfully. Of course, a combination of a time when the authorization certificate is generated or updated and an identity identifier may be taken as a differentiating identifier.

In another embodiment of the present invention, Client A distributes partial of the M copies for the electronic document S to Client B. The electronic document S stored in Client A has been encrypted. The electronic document S is corresponding to the authorization certificate S0. Both Clients A and B adopt database to store authorization certificate including encrypted decryption key, number of authorized copies for an electronic document, the digital digest of an electronic document, the expiring date of an electronic document as well as a timestamp. Although database is taken as a record carrier for authorization certificate in the embodiment of the present invention, it is not limited to adopting database to perform the record in practical applications. For example, a file with a dedicated format or other modes may be adopted to perform the record. Both Clients A and B adopt Ukey as a store device for digital certificates.

In accordance with the embodiment of the present invention, return condition is attached when Client A distributing electronic documents. When the return condition is satisfied, Client A automatically resume number of authorized copies which has been distributed; meanwhile authorization certificate of the electronic document distributed out automatically becomes invalid. In the embodiment, time condition is taken as the return condition. Specifically, the expiring date of the electronic document may be set in the authorization certificate. And whether the expiring date of the electronic document is passed will be determined. If the expiring date of the electronic document is passed, it is determined that the return condition is satisfied. Clients may, periodically or before using electronic documents, determine whether there is an electronic document whose return condition is satisfied. The electronic document will be returned if its return condition is satisfied. At the same time, the validity check performed by the client when using the electronic document may further include checking whether the authorization certificate of the electronic document should be returned based on the return condition. If the authorization certificate should be returned, the validity check is not passed and the electronic document is forbidden to be used.

In the following, detailed descriptions are respectively provided for describing the process in which Client A distributes usage rights of electronic documents as well as the method for Client B receiving and storing the usage rights for electronic documents.

Figure 6:
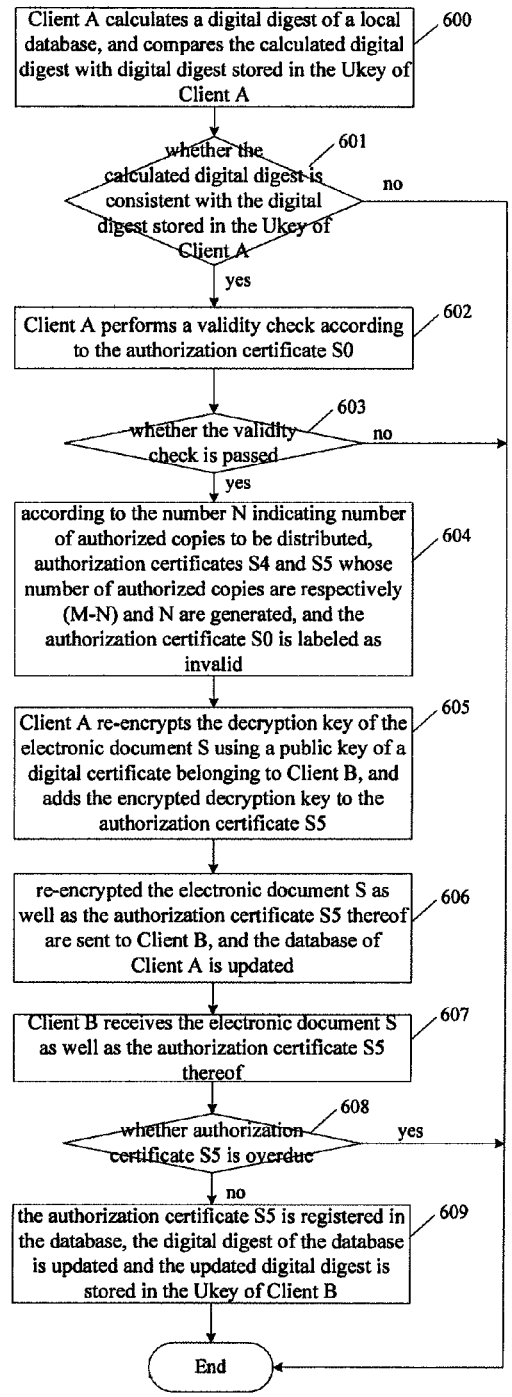
FIG. 6 is a flow chart illustrating a method for distributing usage rights of electronic document in accordance with a third embodiment of the present invention.

FIG. 6 is a flow chart illustrating a method for distributing usage rights of electronic document in accordance with a third embodiment of the present invention. As shown in FIG. 6, the method includes the following blocks.

Blocks 600, 601: Client A calculates a digital digest of a local database, and compares the calculated digital digest with the digital digest stored in the Ukey of Client A. If the calculated digital digest is consistent with the digital digest stored in the Ukey of Client A, block 602 will be performed. Otherwise, the flow will be terminated.

Blocks 602, 603: Client A performs a validity check according to the authorization certificate S0 of the electronic document S. If the validity check is passed, block 604 will be performed. Otherwise, the flow will be terminated.

In the block, Client A obtains the authorization certificate S0 of the electronic document S from the local database and performs the validity check according to the authorization certificate S0. The validity check includes the following. Client A extracts authorized copies information, the digital digest as well as the expiring date of the electronic document from the database, and performs the validity check based on the obtained information. If any of the items is not passed, the validity check is not passed.

Block 604: according to the number N indicating number of authorized copies to be distributed, authorization certificates S4 and S5 whose number of authorized copies are respectively (M-N) and N are generated, and the authorization certificate S0 is labeled as invalid.

In accordance with this embodiment, the authorization certificate S4 and authorization certificate S5 respectively include encrypted decryption key, number of authorized copies, the digital digest of the electronic document, the expiring date of the electronic document and a timestamp.

And the authorization certificate S4 is stored in Client A. The number of authorized copies for the electronic document is (M-N), in which M is larger than N. The timestamp indicates the current time obtained from the time server. The encrypted decryption key, the digital digest of the electronic document, the expiring date of the electronic document are respectively the same as the corresponding contents in the authorization certificate S0.

The authorization certificate S5 will be distributed to Client B. In authorization certificate S5, the number of authorized copies for the electronic document is N, the expiring date of the electronic document may be designated by Client A, or may be the same as that in the authorization certificate S0. The timestamp in the authorization certificate S5 records the current time obtained from the time server. The digital digest of the electronic document in the authorization certificate S5 is the same as that in the authorization certificate S0.

Block 605: Client A re-encrypts the decryption key of the electronic document S using a public key of a digital certificate belonging to Client B, and adds the encrypted decryption key to the authorization certificate S5.

Block 606: re-encrypted the electronic document S as well as the authorization certificate S5 thereof are sent to Client B, and the database of Client A is updated.

In the block, updating the database of Client A includes the following: registering S4 in the database, i.e., establishing a record of the authorization certificate S4 in the database; updating the digital digest of the database and storing the updated digital digest in the Ukey of Client A.

Block 607: Client B receives the electronic document S as well as the authorization certificate S5 thereof.

Block 608: Client B determines whether the authorization certificate S5 is overdue based on the valid register term in the authorization certificate S5. If the valid register term of the authorization certificate S5 is overdue, the flow will be terminated. Otherwise, block 609 will be performed.

Block 609: the authorization certificate S5 is registered in the database, the digital digest of the database is updated and the updated digital digest is stored in the Ukey of Client B.

Figure 7:
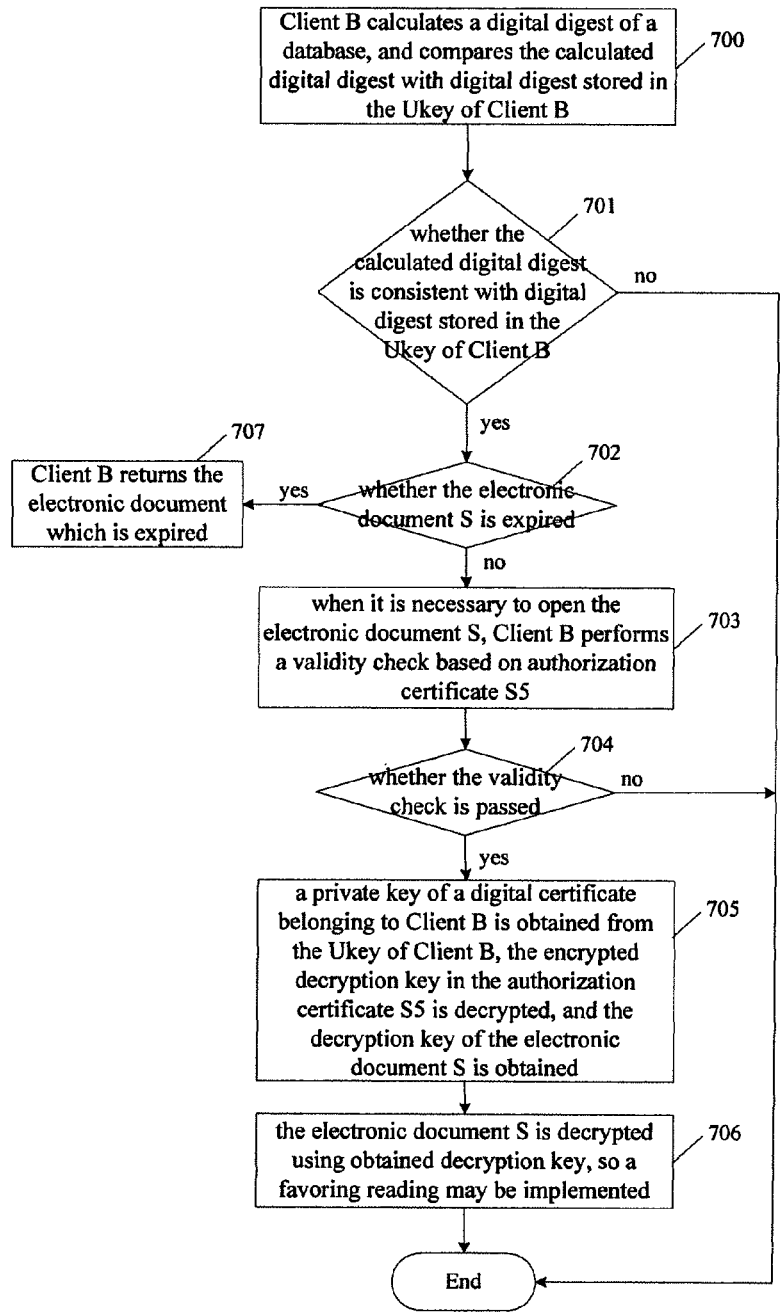
FIG. 7 is a flow chart illustrating a method for adopting usage rights of electronic document in accordance with the third embodiment of the present invention.

FIG. 7 is a flow chart illustrating a method for adopting usage rights of electronic document in accordance with the third embodiment of the present invention. As shown in FIG. 7, the method includes the following blocks.

Blocks 700, 701: when initiating Client B, a digital digest of a database is calculated, and the calculated digital digest is compared with that stored in the Ukey of Client B to determine whether they are consistent with each other, so as to validate the integrity of the database. If the calculated digital digest is consistent with that stored in the Ukey of Client B, block 702 will be performed. Otherwise, the flow will be terminated.

Block 702: whether the electronic document S is expired is determined. If the electronic document S is expired, block 707 will be performed. Otherwise, block 703 will be performed.

In block 702, whether the electronic document S is expired is determined based on the expiring date of corresponding authorization certificate in the database.

Blocks 703, 704: when it is necessary to open the electronic document S, a validity check is performed by Client B based on the authorization certificate S5. If the validity check is passed, block 705 will be performed. Otherwise, the flow will be terminated.

Before performing the validity check, Client B will at first determine whether there is authorization certificate corresponding to the electronic document S among valid authorization certificate locally registered in the database. Here, the authorization certificate corresponding to the electronic document S is the authorization certificate S5. If there is no the authorization certificate S5, the validity check will not be performed and the flow will be terminated.

After obtaining the authorization certificate S5, the validity check includes: calculating the digital digest of the electronic document S; determining whether the calculated digital digest is consistent with that stored in the database, and determining whether number of authorized copies for the electronic document S is not equal to zero according to authorized copies information in the authorization certificate S5. If all items are passed, determining the validity check is passed and Client B is entitled to perform block 705. Otherwise, determining the validity check is not passed.

Block 705: a private key of a digital certificate belonging to Client B is obtained from the Ukey of Client B, the encrypted decryption key in the authorization certificate S5 is decrypted, and the decryption key of the electronic document S is obtained.

Block 706: the electronic document S is decrypted using obtained decryption key, so a favoring reading may be implemented. The flow is terminated.

Block 707: Client B returns the electronic document which is expired.

The block of Client B returning the electronic document includes: authorization certificate corresponding to the expired electronic document in Client B automatically becomes invalid, so that Client B will not be able to use the electronic document. Meanwhile, Client B sends the electronic document which is expired to Client A, and corresponding number of authorized copies for the electronic document is added in database of Client A.

Supposing the electronic document S is expired, after Client B returns the electronic document S and the authorization certificate S5 thereof, Client A, after performing validity check on the local database, determines whether there is a locally registered authorization certificate same as the returned authorization certificate. If there is no locally registered authorization certificate same as the returned authorization certificate, Client A merges returned the authorization certificate S5 and the authorization certificate S4 which number of authorized copies is (M-N) into a new authorization certificate, and registers the new authorization certificate in the database, so as to reduce occupation of local memory. Otherwise, the authorization certificate S5 is forbidden to be registered in the database. Because number of authorized copies is increased by the above merging method when the authorization certificate S4 is registered, in order to avoid increasing number of authorized copies illegally through repeated return and repeated registering, Client A, after merging the authorization certificate, labels the authorization certificate S5 as invalid instead of deleting.

In practical applications, if it is determined that there is an expired electronic document in block 702, Client B may not send the expired electronic document to Client A, but Client A automatically resumes number of authorized copies for the electronic document. For example, Client A will record the expiring date of the authorization certificate S5 after distributing the electronic document S and the authorization certificate S5 thereof. When the electronic document S is expired, Client A will automatically resume number of authorized copies for the electronic document.

In practical applications, an authorization server may be introduced to register number of authorized copies for each electronic document owned by each client, so as to implement uniform management. The authorization server may also record authorization information, such as digital digest, the expiring date of each electronic document, etc. When Client A distributes the electronic document S, Client A sends the electronic document S to Client B and sends the authorization information including number of authorized copies for distributed electronic document to the authorization server. According to received authorization information, the authorization server increases number of authorized copies for electronic document owned by the receiver, meanwhile reduces number of authorized copies for electronic document owned by the sender. The authorization server may automatically implement operations of returning an expired electronic document based on the expiring date of the electronic document. When it is necessary for Client B to use the electronic document S, Client B sends a validity check request to the authorization server. The authorization server performs a validity check for Client B according to stored authorization information. If the validity check is passed, the authorization server sends an encrypted decryption key to Client B. Client B performs a decryption using a private key of its digital certificate to obtain the decryption key, and subsequently may decrypt electronic document S. Definitely, the authorization server may also send the authorization information to Client B, and may allow Client B performing the validity check and the decryption.

From the above descriptions it can be seen that in accordance with the technical solution provided by embodiments of the present invention, not only the DRM may be achieved but also the distribution for number of authorized copies for electronic document may be achieved, meanwhile security for electronic documents during distribution may be guaranteed. The technical solution provided by embodiments of the present invention possesses an attribute of well anti-attack, and may avoid resuming number of authorized copies for electronic documents illegally.

During the distribution, security of electronic document may be guaranteed by encrypting the electronic document with encryption logic of an authorized user and then sending the encrypted electronic document, so that the electronic document cannot be opened by an illegal user.

In accordance with the embodiment of the present invention, using rules, such as number of authorized copies for electronic document and expiring date of the electronic document, etc, are sent to authorized users as authorization certificate. And then the authorized users may use the electronic documents within right limitation according to the using rules.

In accordance with the embodiment of the present invention, registered authorization certificate including invalid and valid authorization certificate is recorded. When registering the obtained authorization certificate, if there is repeated authorization certificate among locally stored and registered authorization certificate of the authorization certificate to be registered, registering for the obtained authorization certificate will be forbidden, so as to avoid repeated registration.

In accordance with the embodiment of the present invention, a unique identifier for each authorization certificate may be further set in each authorization certificate. Therefore, in the above determining, whether there is repeated authorization certificate among locally stored and registered authorization certificate of the authorization certificate to be registered may be achieved by comparing the unique identifier for the authorization certificate of the received electronic document with the unique identifier for authorization certificate locally stored and registered. Thus, the above determining may be achieved by merely comparing one field, such that the comparing process may be more easy and faster.

In accordance with the embodiment of the present invention, a valid register term may be introduced to the authorization certificate. Authorization certificate which valid register term is overdue may not be registered. Furthermore, the invalid authorization certificate which valid register term is overdue may be removed from the system. And then only the invalid authorization certificate of which valid register term is not overdue may be stored in the system, so as to avoid registering repeatedly and lower burden of the system.

The authorization certificate in embodiments of the present invention is different from "authorization certificate" in the prior art, the purpose of the "authorization certificate" in the prior art is to guarantee an authorized user to use a document legally, the authorization is fixed and unchanged, so the operation of coping the "authorization certificate" will not effect the security of rights. That is to say, the user who possesses the "authorization certificate" can use the document, while the user who does not possess the "authorization certificate" can not use the document even if having a copy of the "authorization certificate", i.e., the "authorization certificate" in the prior art neither needs to solve a problem of avoiding rights copy, nor provides a corresponding technical solution for solving the problem, so fails to solve the problem.

As for the application of the rights distribution in the present invention, it is not only needed to guarantee the user is an authorized person who can use the document, but also needed to guarantee the user can not resume the original rights after distributing the number of authorized copies of the document, so it is necessary to avoid the rights copy. But using the "authorization certificate" in the prior art, the use can copy the authorization certificate, where, the number of authorized copies of the document, i.e., the number of the rights, recorded in each copy of the authorization certificate is valid, thus the number of authorized copies of the document which the user can use legally may be the number of authorized copies of the document recorded in the authorization certificate multiplied by times of coping the authorization certificate, and therefore, the user can copy the authorization certificate and use it without limitation, which leads the right control become out of control.

By utilizing the technical solutions of the present invention, the user can not use any authorization certificate and obtain the number of authorized copies to be distributed from it if the authorization certificate is not registered, the repeated registration of the authorization certificate is further avoided in the present invention, and then the repeated usage of the authorization certificate is avoided. The authorization certificate for the user is unique and is controlled by registration, this guarantee that the user is a specific authorized user, and further the user has to use the rights within the limitation of the authorized number of authorized copies. For it is impossible for any illegal copy of the authorization certificate to pass the registration validation of the system, the user can not use the document by utilizing the illegal copy of the authorization certificate, and then it is impossible for the user to increase the number of the rights by coping the authorization certificate. The technical solutions in the present invention avoid copying the rights during the rights' distribution, and solve s the right security problem during the rights' distribution.

Figure 8:
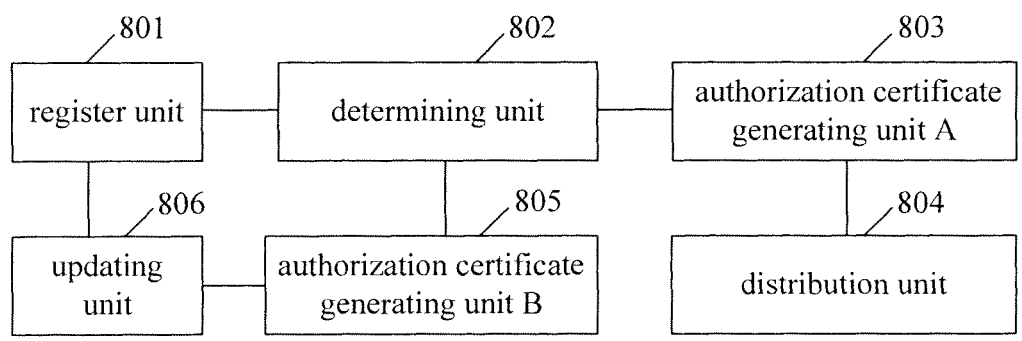
FIG. 8 is a schematic diagram illustrating architecture of a management device for implementing usage rights of electronic document in accordance with an embodiment of the present invention.

FIG. 8 is a schematic diagram illustrating architecture of a management device for implementing usage rights of electronic document in accordance with an embodiment of the present invention. As shown in FIG. 8, the management device in the embodiment includes: a register unit 801, a determining unit 802, an authorization certificate generating unit A803, a distribution unit 804, an authorization certificate generating unit B805 and an updating unit 806.

The register unit 801 is adopted to register the first authorized copies information in/out an electronic document, e.g., to register the first authorization certificate of an electronic document, in which the first authorization certificate includes the first authorized copies information of the electronic document.

The determining unit 802 is adopted to determine whether the first authorization certificate of the electronic document is valid. If the determining unit 802 determines that the first authorization certificate is valid, it means that the distribution unit 804 is entitled to distribute electronic documents.

And then the authorization certificate generating unit A803 is adopted to generate the second authorization certificate of the electronic document, in which the second authorization certificate includes the second authorized copies information of the electronic document. Here, the number of authorized copies recorded in the second authorized copies information may be part of or whole of the number of authorized copies recorded in the first authorized copies information, which may also be referred to as number of authorized copies for distribution.

The distribution unit 804 is adopted to distribute the electronic document as well as the second authorization certificate.

The authorization certificate generating unit B805 is adopted to generate the third authorization certificate of the electronic document, in which the third authorization certificate includes the first authorized copies information updated. Here, the number of authorized copies recorded in the first authorized copies information is the result obtained by subtracting the number of authorized copies recorded in the second authorized copies information from another number of authorized copies recorded in the first authorized copies information last time.

And then the updating unit 806 is adopted to label the first authorization certificate in register unit 801 as invalid, and take the third authorization certificate generated by the authorization certificate generating unit B805 as the updated first authorization certificate.

Alternatively, if the management device does not include the authorization certificate generating unit B805, the updating unit 806 will directly update the number of authorized copies recorded in the first authorized copies information in the first authorization certificate of register unit 801 by subtracting the number of authorized copies recorded in the second authorized copies information from another number of authorized copies recorded in the first authorized copies information recorded last time. And subsequently the updated first authorization certificate may be obtained.

The foregoing descriptions are only preferred embodiments of the present invention and are not used for limiting the protection scope thereof. All the modifications, equivalent replacements or improvements in the scope of the present invention's spirit and principles shall be included in the protection scope of the present invention.

The invention claimed is:

1. A method for distributing an electronic document, comprising:

registering a first authorization certificate of an electronic document, wherein the first authorization certificate comprises authorized copies information of the electronic document; taking the authorized copies information of the electronic document in the first authorization certificate as a first authorized copies information of the electronic document; wherein the first authorized copies information records a first number of authorized copies for the electronic document a local user may distribute, every time distributing the electronic document to a user the method comprises:

sending second authorized copies information to the user, wherein the second authorized copies information records a second number of authorized copies for the electronic document the user may distribute, and the second number of authorized copies is less than or equal to the first number of authorized copies currently recorded in the first authorized copies information;

updating the first authorized copies information, updated first number of authorized copies recorded in the updated first authorized copies information is equal to a value obtained by subtracting the second number of authorized copies from the first number of authorized copies recorded in the first authorized copies information last time;

before registering the first authorization certificate of the electronic document, determining whether there is a registered authorization certificate which is same with the first authorization certificate; wherein, determining whether there is a registered authorization certificate which is same with the first authorization certificate comprises: determining whether there is a registered authorization certificate having the same copies information with that of the first authorization certificate;

refusing to register the first authorization certificate of the electronic document if there is a registered authorization certificate which is same with the first authorization certificate.

2. The method according to claim 1, wherein each authorization certificate is identified by a unique identifier, and determining whether there is a registered authorization certificate which is same with the first authorization certificate comprises:
  determining whether there is one identifier of a registered authorization certificate which is the same as that of the first authorization certificate;
  determining there is a registered authorization certificate which is same with the first authorization certificate if there is one identifier of a registered authorization certificate which is the same as that of the first authorization certificate.

3. The method according to claim 1, wherein the first authorization certificate further comprises a valid register term, the method further comprises:
  before registering the first authorization certificate of the electronic document, determining whether current time is later than the valid register term in the first authorization certificate,
  refusing to register the first authorization certificate of the electronic document if the current time is later than the valid register term in the first authorization certificate.

4. The method according to claim 1, further comprising:
  before sending the second authorized copies information to the user, performing a validity check according to the first authorization certificate of the electronic document,
  allowing sending the second authorized copies information to the user if the validity check is passed.

5. The method according to claim 4, wherein performing the validity check according to the first authorization certificate of the electronic document comprises:
  determining whether the first number of authorized copies recorded in the first authorized copies information of the first authorization certificate is less than or equal to zero,
  determining the validity check is not passed if the first number of authorized copies is less than or equal to zero.

6. The method according to claim 4, wherein the first authorization certificate further comprises a digital digest of the electronic document, and the validity check further comprises:
  calculating the digital digest of the electronic document,
  determining the validity check is not passed if the calculated digital digest is not consistent with digital digest in the first authorization certificate.

7. The method according to claim 1, wherein the first authorization certificate further comprises a return condition, and the method further comprises:
  determining whether the first authorization certificate meets the return condition periodically or before sending the second authorized copies information to the user;
  setting the first authorization certificate as invalid if the first authorization certificate meets the return condition.

8. The method according to claim 7, wherein the return condition is an expiring date, and determining whether the first authorization certificate meets the return condition comprises:
  determining whether the expiring date is passed;
  determining the return condition is met if the expiring data is passed.

9. The method according to claim 1, wherein sending the second authorized copies information to the user comprises:
  establishing second authorization certificate of the electronic document, wherein, the second authorization comprises the second authorized copies information;
  sending the second authorization certificate to the user.

10. The method according to claim 1, wherein the updated first authorized copies information comprises:
  establishing third authorization certificate of the electronic document, and the third authorization certificate comprises the updated first authorized copies information;
  labeling the first authorization certificate as invalid;
  taking the third authorization certificate as updated first authorization certificate.

11. The method according to claim 1, further comprising:
  recording a return condition of the second authorized copies information when sending the second authorized copies information to the user;
  resuming the updated first authorization certificate to the first authorization certificate, when the return condition of the second authorized copies information is met.

12. A device for distributing an electronic document, comprising: a processor and a memory;
  the processor is adapted to communicate with the memory, and to execute machine readable instructions in the memory;
  the memory is adapted to store the machine readable instructions implementing the following operations when executed by the processor:
  to register a first authorization certificate of an electronic document in or out the electronic document, wherein the first authorization certificate comprises first authorized copies information of the electronic document;
  to send the electronic document and second authorized copies information to a user, wherein the second authorized copies information is used to record a second number of authorized copies for the electronic document which the user may distribute, and the second number of authorized copies recorded by the second authorized copies information is less than or equal to a first number of authorized copies currently recorded in the first authorized copies information;
  to update the first authorized copies information using the second authorized copies information, wherein updated first number of authorized copies recorded in the updated first authorized copies information is equal to a value obtained by subtracting the second number of authorized copies from the first number of authorized copies recorded in the first authorized copies information last time;
  to determine, before registering the first authorization certificate of the electronic document, whether there is a registered authorization certificate having the same copies information with that of the first authorization certificate;
  to refuse to register the first authorization certificate of the electronic document if there is a registered authorization certificate which is same with the first authorization certificate.

13. The device according to claim 12, wherein the memory is further adapted to store the machine readable instructions implementing the following operations:
  to determine whether the registered first authorization certificate is valid; and
  to send the second authorized copies information of the electronic document to the user when the fourth unit determines that the first authorization certificate is valid.

14. The device according to claim 13, wherein the memory is further adapted to store the machine readable instructions implementing the following operations:
  to generate the second authorization certificate of the electronic document when it is determined that the registered first authorization certificate is valid;

to send the electronic document and second authorization certificate to the user, and the second authorization certificate comprises the second authorized copies information.

15. The device according to claim 14, wherein the memory is further adapted to store the machine readable instructions implementing the following operations: when it is determined that the first authorization certificate is valid, to replace the first authorized copies information in the first authorization certificate with the updated first authorized copies information, to obtain the updated first authorization certificate.

16. The device according to claim 12, wherein the memory is further adapted to store the machine readable instructions implementing the following operations:

to generate a third authorization certificate of the electronic document when it is determined that the registered first authorization certificate is valid;

to label the first authorization certificate as invalid and take the third authorization certificate as new first authorization certificate, and the third authorization certificate comprises the updated first authorized copies information.

* * * * *